Jan. 1, 1963 D. E. ROWE, SR 3,070,917
FISH LURE
Filed Dec. 11, 1958
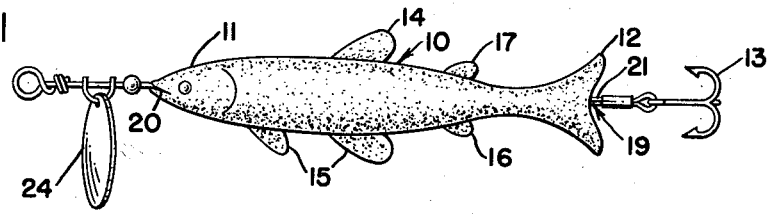
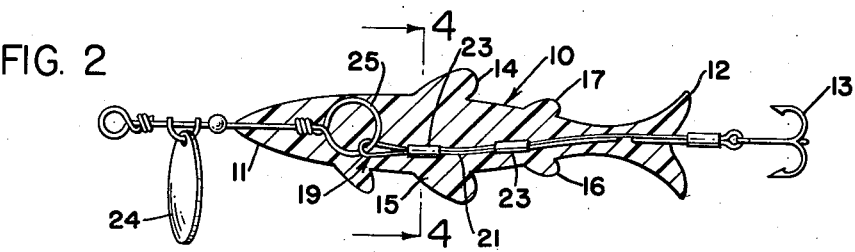
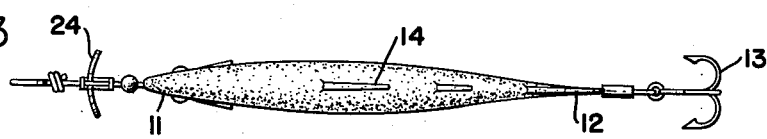
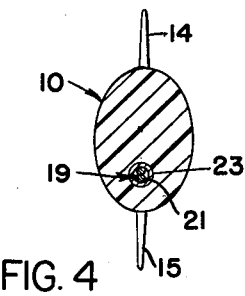
FIG. 4
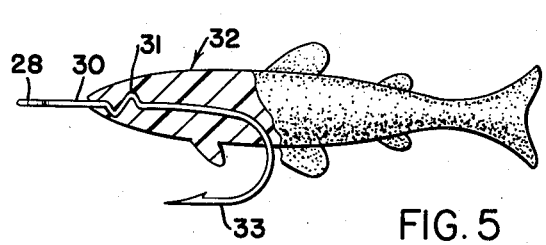
FIG. 5
FIG. 6
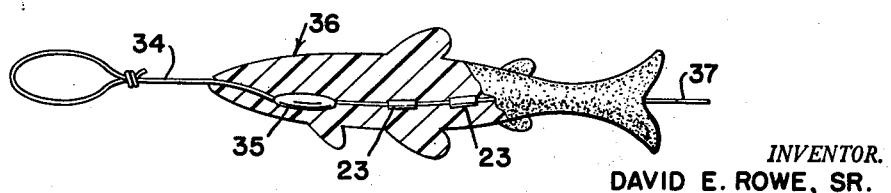
FIG. 7
INVENTOR.
DAVID E. ROWE, SR.
BY
Fay & Fay
ATTORNEYS United States Patent Office 3,070,917
Patented Jan. 1, 1963

3,070,917
FISH LURE
David E. Rowe, Sr., 3742 Cress Road, Cleveland 11, Ohio
Filed Dec. 11, 1958, Ser. No. 779,744
1 Claim. (Cl. 43—42.24)

This invention, relating as indicated to a fishing lure, is particularly directed to an improved fishing lure formed from an elastomeric polymer, such as polyvinyl chloride or other suitable material, colored in an attractive way to serve as a lure and having incorporated in the lure a series of enlargements around and a longitudinally extending support member of wire or plastic material.

In general in connection with fishing lures, various efforts have been made prior to this time to mold colored elastomeric material, such as polyvinyl chloride and the like, but all of the results obtained were not entirely satisfactory. These lures were not as colorful and when bit by a fish sometimes separated and thereby became useless.

This present invention then is generally directed to a new type of lure attractively colored and incorporating various kinds of hooks, spinners and the like. This lure will ride upright in a life-like manner.

An object of this invention is to provide a new and improved lure of an attractive design which will not be expensive but of a sturdy construction, and this lure may have attached to it hooks of various kinds.

A further object of this invention is to provide an elastomeric lure brightly colored and having one or more hooks or gang hooks in connection therewith, with a series of longitudinal supports and enlargements on said supports through the body. In the event that the sharp teeth of a fish should cut or bite through the elastomeric material, each of these enlargements serves as a holding support for a mass of elastomer laterally thereof so that it will troll properly.

A further object of this invention is to provide a well-balanced fish lure that will maintain an even keel and advance through the water in such a manner that the center of gravity is below the center line and may be oscillated by various types of spinners and spoons to attract fish and at the same time not turn upside down.

A further object of this invention is to provide a new and improved fish lure consisting of an elastomeric or plastic body that will be subject to only a slight strain when a fish is hooked and will not become detached or loosened from the wire leader passing through the plastic body when the fish bites on this elastomeric body.

To the accomplishment of the foregoing and related ends, said invention then consists of the means hereinafter fully described and particularly pointed out in the claim; the following description setting forth in detail one approved method of carrying out the invention, such disclosed method, however, constituting but one of the various ways in which the principles of the invention may be used.

In the drawings:

FIG. 1 is a side elevational view of the fish lure;

FIG. 2 is an elevational cross-sectional view of the lure;

FIG. 3 is a top view of the fish lure;

FIG. 4 is a transverse cross-sectional view taken on line 4—4 of FIG. 2;

FIG. 5 is a modification showing a fragmentary side elevational view of the lure with parts broken away;

FIG. 6 is a top view of the modification shown in FIG. 5; and

FIG. 7 is a fragmentary side elevational view, partly in section, of a modification of the fish lure.

Referring now to the drawings wherein like reference characters designate corresponding parts, the improved fishing lure of this invention comprises a body 10, a head 11 and a tail 12.

As illustrated in the drawings, particularly FIGS. 1 and 2, the body is provided with a dorsal fin 14 and a pair of rib-like, arcuately formed, lower front fins 15 in back of the head 11 and disposed on the body in a vertical position. There are also shown, although these may vary with the particular design, a lower rear fin 16 and an upper rear fin 17.

The fish-shaped body 10 is of molded elastomeric material, preferably an elastomeric polymer, formed from small sections of various colored plastics to provide an attractive design. It is formed around a longitudinal supporting wire 19 throughout its length from the mouth 20 in the head 11 of the fish 10 and through the posterior end of the tail 12. This is formed of a flexible wire 21 with a fish hook 13 attached to the rear end and in a gang hook. A spinner 24 may be secured to the wire extending outwardly from the mouth 20 of the head section 11.

It will be noted in FIG. 2 in cross-section that there are various enlargements 23 by which means the wire or strong plastic material forms an enlarged section around which the plastic material will grip in the event that a cutting by teeth or other means severs sections of the plastic. The remaining portions of the plastic will grip to the enlargements and will not slide along the wire. These enlargements 23 may be in the form of fasteners or lead weights and serve the joint purpose of stabilizing the fish so that it will remain upright in trolling no matter what action is taken because of the movement of the spinners. It is further positioned in such a way together with the metal weights or wedges on the wire that the lure has proper balance and can be led through the water in a position similar to that of a fish swimming. By this means also the proper balance of specific gravity may be obtained in the lure even though the plastic would generally be lighter than that of water.

If desired, the fish lure may be cut by the fisherman at one or more points to provide in this way exaggerated movements. That is to say, because the plastic is molded around the various weights, the sections of the body may be completely severed down to the supporting wire 21 and facilitate movement in the lure.

FIG. 3 shows a top view of the same lure, and FIG. 4 shows a cross-sectional view as well as a central lower fin 15.

FIG. 5 is a further modification and in this instance a hook 30 having a zig-zag portion 31 secures the elastomeric body 32 to the hook. The hook portion extends out the belly of the lure at 33.

FIG. 6 is a top view of the same lure showing the eye of the hook 28.

FIG. 7 shows a further modification, in which a nylon or wire element 34 has a weight 35 attached to the line, and the plastic material in the lure as shown at 36 will cling to the enlargement or weight, and in this manner facilitates the attachment as a sudden pull of the plastic material could slip the lure along the line. This would be particularly disastrous in the event that the lure were severed at one or more points. The wire leading out as shown at 37 may be used for attachment of hooks.

Since the center of gravity of the fish lure, as positioned by the weight 35 and attachments 23 on the wire 34 is below the metacentric point, the elastomeric fish will ordinarily oscillate from an upright position describing a half roll, first one way and then the other as it is pulled through the water. The spinner and hooks swing laterally back and forth giving the lure the apearance of a swimming fish.

The wire 21 passing through the elastomeric body and the mouth 20 of the fish lure ordinarily has a loop 25 on it a short distance beyond the point at which it leaves the mouth, whereby a line may be connected to the wire. The wire 21 passing through the tail 12 is looped and twisted with a hook 13 attached to the loop. It is to be understood that a nylon wire may be used instead of a steel wire, although in connection with this invention a steel wire is preferred. Likewise, the distance of the fish hook from the tail may be varied.

In a preferred procedure for producing the present invention portions of an elastomeric copolymer, such as the commercially available polyvinyl chloride-polyvinyl acetate which consists of 80–95 percent of the former and 20 to 5 percent of the latter, are separately mixed with suitable dyes or pigments, and from 10 to 30 percent by weight of a plasticizer such as tricresyl phosphate or dioctyl phthalate. The prepared colored copolymer mixed with plasticizer is now arranged in the mold to provide a finished product having the desired color pattern. To prevent eventual sticking of the plastic material to the metal mold it is desirable to apply a film of carnauba wax or other suitable lubricant to the interior of the metal mold before placing the copolymer in the mold. The mold is now heated sufficiently so that the plasticized copolymer contained therein will form a self sustaining mass.

The wire 21 is now placed from end to end over one section of the mold containing the partially cured plastic. At this point a minute amount of a suitable blowing agent such as diamyl ammonium nitrite to prevent the molded plastic from shrinking may be dusted on the partially cured elastomer, though the use of a blowing agent results in a porous product of somewhat reduced strength.

The closed sections of the mold are now heated to 300° F. to 350° F. under a pressure of from 200 to 500 pounds per square inch for from 5 to 20 minutes under such conditions that the pressure is uniform over every unit of area of the mold surface and that the copolymer is consolidated and united into a homogeneous mass.

The use of a vinyl chloride-vinyl acetate copolymer to which a suitable plasticizer has been added has been given primary consideration, though a large number of thermoplastic resins have also been tried and found satisfactory. These include: polyvinyl idene chloride, methylacylate, polystyrene and the polyvinyl acetals.

Although the present invention has been described in connection with a few preferred embodiments thereof, variations and modifications may be resorted to by those skilled in the art without departing from the principles of the invention. All of these variations and modifications are considered to be within the true spirit and scope of the present invention as disclosed in the foregoing description and defined by the appended claim.

I claim:

A fishing lure comprising a molded and resilient plastic body in the design and proportions of a live fish bait having a body, tail, and head as viewed in side elevation, a thin flexible wire member extending longitudinally from the head through the lowermost portion of the body and out the tail portion, spaced weighted portions having a small diameter positioned on said flexible wire, said weighted portions being disposed in the body with the uppermost portion thereof lying below a horizontal plane passing through the center of the head and tail portions, the weighted portions thereby being below the natural center of gravity of the plastic body to promote good flexing to simulate the natural movements of a fish, the weighted portions further providing stability for the lure in trolling without impairment of flexibility, said thin flexible wire having at least a single hook attached thereto so that the pull of a fish when caught will be transmitted directly through the body without stretching thereof with the flexible body portion being straightened by the pull.

References Cited in the file of this patent

UNITED STATES PATENTS

| | | |
|---|---|---|
| 2,235,600 | Ammerman | Mar. 18, 1941 |
| 2,437,549 | Pecher | Mar. 9, 1948 |
| 2,632,277 | Cogswell et al. | Mar. 24, 1953 |
| 2,643,418 | Auldridge | June 30, 1953 |
| 2,718,668 | Burke | Sept. 27, 1955 |
| 2,776,518 | Felmlee | Jan. 8, 1957 |
| 2,828,572 | Sargent | Apr. 1, 1958 |
| 2,847,791 | Simmons | Aug. 19, 1958 |

FOREIGN PATENTS

| | | |
|---|---|---|
| 685,135 | Great Britain | of 1952 |